Patented Oct. 30, 1951

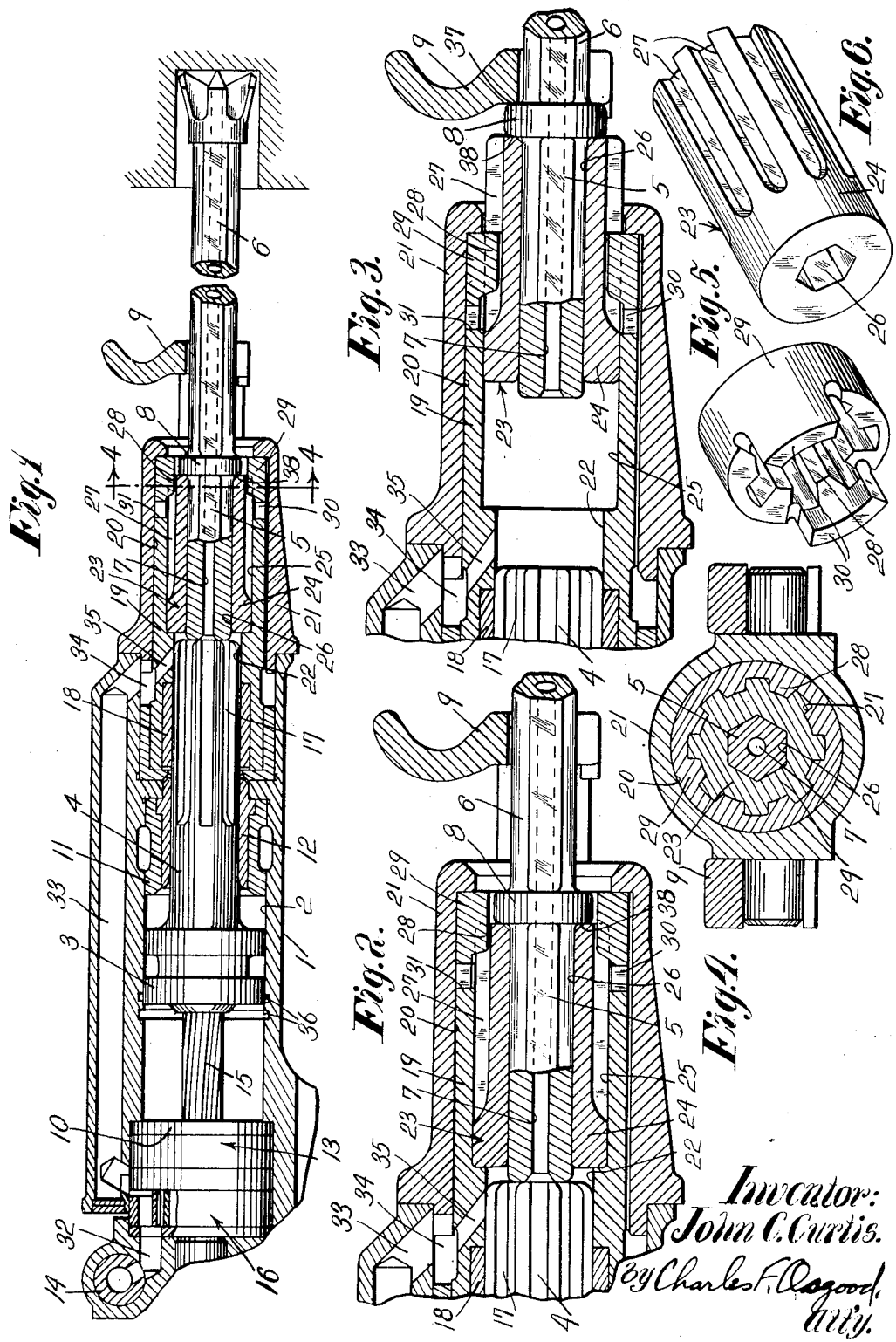

2,572,840

UNITED STATES PATENT OFFICE 2,572,840

ROCK DRILL

John C. Curtis, Claremont, N. H., assignor to Joy Manufacturing Company, a corporation of Pennsylvania Application May 4, 1946, Serial No. 667,383

13 Claims. (Cl. 121—32)

This invention relates to rock drills and more particularly to improvements in the drill steel chuck mechanism of a hammer rock drill.

In conventional rock drills, the chuck bushing which receives and supports the shank of the drill steel is usually held against axial movement in the drill chuck so that the steel shank reciprocates relative to the bushing during operation of the drill, resulting in considerable wear between the parts. Also in conventional rock drills when the drill steel shank is moved outwardly in the bushing, there is considerable leakage of pressure fluid from the motor cylinder through the bushing past the steel shank, particularly during the hole blowing operation, as for example, when the drill is being retracted from the work with the steel collar held in an outward position against the yoke of the drill steel retainer. Further, in conventional rock drills, when the drill steel shank is moved outwardly in the bushing out of reach of the piston, the conventional chuck bushing must be relatively short in length to prevent contact of the piston striking bar with the bushing, and resultantly the bushing bearing surfaces are necessarily relatively small.

The present invention, in a preferred embodiment, contemplates the overcoming of the disadvantages above outlined by mounting the chuck bushing for axial sliding or reciprocatory movement in the chuck. By slidably mounting the chuck bushing, the latter tends to reciprocate with the steel shank during the drilling operation, thereby to reduce wear between the parts. When the steel shank moves outwardly in the drill chuck, the chuck bushing follows the steel shank and is held by the pressure fluid acting on the rear end of the bushing outwardly with its forward end abutting the steel collar, thereby to provide a substantial seal so that substantial leakage of pressure fluid from the motor cylinder past the steel shank is prevented. During the hole blowing operation, as for example, when the drill is being retracted from the work, the pressure of the fluid acting on the rear end of the chuck bushing holds the steel collar outwardly against the yoke of the steel retainer with the front end of the bushing substantially sealed against the steel collar so that substantial leakage of the pressure fluid from the motor cylinder past the steel shank is prevented, thereby causing pressure fluid to flow in substantial quantity through the steel bore to the bottom of the drill hole to clear away the cuttings from the drill bit. Further, when the steel shank moves outwardly in the drill chuck, the chuck bushing moves with the steel away from the front end of the hammer piston so that the possibility of the piston striking bar striking against the rear end of the bushing is avoided. By mounting the bushing for sliding movement, the bushing may be made relatively long, providing increased bearing surfaces.

An object of the present invention is to provide an improved rock drill chuck mechanism. Another object is to provide an improved drill steel chuck mechanism for a hammer rock drill wherein the chuck bushing is mounted in an improved manner. Yet another object is to provide an improved chuck bushing which is mounted for axial sliding movement in the drill chuck so that the bushing tends to reciprocate with the drill steel during the drilling operation. A still further object is to provide an improved reciprocably mounted chuck bushing which is adapted to have substantial sealing engagement with the drill steel collar to prevent substantial leakage of the pressure fluid from the motor cylinder through the bushing bore past the steel shank when the latter is moved outwardly in the bushing. Still another object is to provide an improved drill steel chuck mechanism having an improved chuck bushing mounted for axial sliding movement so that when the steel collar moves outwardly against the yoke of the drill steel retainer, as during the hole blowing operation, as for example when the drill is being retracted from the work, the bushing has substantial sealing engagement with the steel collar to prevent substantial leakage of the pressure fluid from the drill chuck through the bushing past the steel shank, thereby to cause the pressure fluid to flow in substantial quantity through the steel bore to the bottom of the drill hole to clear away the cuttings from the drill bit. Yet another object is to provide an improved sliding chuck bushing which is of increased length providing relatively large bearing surfaces. Still another object is to provide an improved reciprocably mounted, relatively elongated chuck bushing which may be moved outwardly in the drill chuck out of contact with the piston striking bar when the steel shank is moved outwardly out of reach of the hammer piston. A still further object is to provide an improved sliding chuck having sliding interlocking connection with a rotatable chuck sleeve. These and other objects and advantages of the invention will, however, hereinafter more fully appear.

In the accompanying drawing there is shown for purposes of illustration one form which the invention may assume in practice.

In this drawing:

Fig. 1 is a longitudinal vertical sectional view through a hammer rock drill in which an illustrative form of the invention is embodied.

Fig. 2 is an enlarged sectional view taken on the plane of Fig. 1, illustrating the improved drill steel chuck with the chuck bushing and steel shank in their innermost position.

Fig. 3 is a sectional view similar to Fig. 2, showing the chuck bushing and steel shank in their outermost position with the steel collar abutting the yoke of the drill steel retainer.

Fig. 4 is an enlarged cross-sectional view taken substantially on line 4—4 of Fig. 1.

Fig. 5 is a perspective view of the splined driver sleeve.

Fig. 6 is a perspective view of the improved sliding chuck bushing.

In this illustrative embodiment of the invention there is shown a hammer rock drill comprising a motor cylinder 1 having a bore 2 containing a reciprocatory hammer piston 3. The hammer piston has a forward reduced cylindric extension or striking bar 4 for delivering impact blows to the polygonal shank 5 of a conventional drill steel 6. The drill steel has an axial bore 7 and a usual collar 8 which is engageable with the yoke of a conventional drill steel retainer 9 when the drill steel is in its outward position, as for example, when the drill is being retracted from the work. The cylinder has a rear head 10 and a front buffer ring 11, the latter supporting a bearing sleeve 12 in which the piston striking bar 4 is reciprocably guided. A conventional automatic fluid distributing valve mechanism, generally designated 13 (Fig. 1), controls the flow of pressure fluid from a throttle valve 14 through conventional fluid conducting passages to the opposite ends of the cylinder bore to effect reciprocation of the hammer piston and the cylinder has a usual piston controlled exhaust, all in the manner well known to those skilled in the art. This automatic valve mechanism and the associated fluid conducting and exhaust passages may be generally similar to those described in my Patent No. 2,224,859, dated December 17, 1940.

As is usual in rock drills of the type disclosed, the drill steel 6 is intermittently rotated by the hammer piston as the latter reciprocates to effect percussive actuation of the drill steel, and the mechanism for accomplishing this comprises a spirally grooved rifle bar 15 which is automatically held against rotation in one direction by a ratchet and pawl device, generally designated 16 (Fig. 1) and which is free to rotate in the opposite direction, in the manner also described in the patent above referred to. The rifle bar has sliding interlocking engagement with the spiral lugs of a usual rifle nut secured within the hammer piston. Thus as the piston moves forwardly to strike a blow on the steel shank, the pawls of the ratchet and pawl device slip relative to the teeth of the ratchet to permit free rotation of the rifle bar so that the piston moves freely forwardly to strike an unimpeded blow against the steel shank. Upon reversal of the hammer piston, the rifle bar is automatically held against rotation by the pawls engaging the teeth of the ratchet so that as the piston moves rearwardly, it is rotated by the spiral lugs of the rifle nut engaging the spiral grooves of the then stationary rifle bar. This rotative movement of the piston is transmitted to the drill steel through straight grooves 17 on the piston striking bar coacting with the straight lugs of a usual chuck nut 18 secured to a rotatable chuck sleeve 19. The chuck sleeve is rotatably mounted at its forward portion in a bore 20 of a front chuck housing 21 suitably secured to the front end of the motor cylinder, with its rearward portion journaled within a bearing sleeve supported within a front bore of the motor cylinder. The chuck sleeve has a bore 22 which receives the forward end of the piston striking bar in the manner shown.

The improved chuck bushing is generally designated 23 and has a cylindrical body 24 slidably mounted in an enlarged bore 25 formed in the rotatable chuck sleeve 19 in alignment with and in advance of the bore 22. The bushing has an axial opening 26 of polygonal cross section which receives the polygonal shank of the drill steel, and the steel shank and bushing rotate together. By the provision of the sliding mounting for the chuck bushing, it is possible to make the bushing body of greater length than that of a conventional bushing, thereby to afford larger bearing surfaces in the chuck sleeve bore. Since the chuck bushing may slide freely outwardly when the steel shank is moved outwardly in the drill chuck out of reach of the piston striking bar, the possibility of the piston striking against the bushing is avoided. On the outer periphery of the bushing body are longitudinal splineways 27 which engage splines or keys 28 on a driver sleeve 29, the latter having clutch jaws 30 interlocked with mating clutch jaws 31 on the front end of the rotatable chuck sleeve 19 so that the sleeves 19 and 29 rotate together.

In accordance with this invention, hole blowing means is provided for supplying a large quantity of pressure fluid to the bottom of the drill hole to blow the hole and comprising passages 32 and 33 leading from the throttle valve 14 and communicating with an annular space 34 surrounding the rotatable chuck sleeve. A passage 35 connects the space 34 with the bore 22. When the throttle valve 14 is positioned as shown in Fig. 1, flow of pressure fluid to the valve mechanism 13 is substantially cut off and pressure fluid may flow through passages 32 and 33, annular space 34 and passage 35 to the bore 22, and thence through the bore 25 and axial passage 7 in the drill steel to the bottom of the drill hole to clear away the cuttings from the drill bit. The continuous flow of pressure fluid to the bores 22, 25 during the hole blowing operation acts on the front end of the piston striking bar 4 to retract the piston in a well known manner substantially to the position shown in Fig. 3 with the piston head substantially closing the cylinder exhaust 36 and concurrently pressure fluid acts on the rear end of the chuck bushing to hold the latter in its outward position against the collar 8 of the drill steel and with the steel collar held outwardly at 37 against the yoke of the drill steel retainer 9, as is also shown in Fig. 3.

During normal drilling, as the hammer piston reciprocates, pressure fluid may intermittently flow from the front end of the cylinder bore through the grooves 17 on the piston striking bar to the bores 22 and 25 and through the steel bore 7 to the bottom of the drill hole to keep the drill bit clear of cuttings. The pressure fluid flowing into the bore 25 acts on the inner end of the chuck bushing to hold the outer end of the latter in substantial sealing contact at 38 with the steel collar 8 so that substantial leakage of fluid through the chuck bushing past the steel shank is prevented, thereby causing flow of pressure fluid in substantial quantity through the steel bore to the bottom of the hole. Also by the provision of the sliding mounting for the chuck bushing, the latter tends to reciprocate with the steel shank so that wear between the bushing and shank is substantially reduced. In the event the drill bit of the drill steel penetrates a cavity in the work during drilling or when the drill is retracted from the work, the steel collar 8 will move outwardly into contact with the yoke of the steel retainer 9 while the chuck bushing remains in substantial sealing contact with the steel collar, and since the bushing moves outwardly with the drill steel, the possibility of contact of the piston striking bar with the bushing is avoided. As the hammer piston reciprocates during drilling, the chuck sleeve 19 is intermittently rotated by the piston and sleeve-rotation is transmitted to the drill steel through the driver sleeve 29 which is clutched to the chuck sleeve and splined to the chuck bushing. The cylindrical rearward portion of the slidable chuck bushing has a tight sealing fit with the sleeve-bore 25 substantially to prevent leakage of fluid from the chuck sleeve-bore forwardly past the chuck bushing through the splineways.

As a result of this invention, an improved rock drill chuck mechanism is provided wherein substantial leakage of pressure fluid through the chuck bushing past the steel shank is prevented so that efficiency is improved and fluid in large quantity may flow through the drill steel bore to the bottom of the hole to clear away the cuttings from the drill bit in an extremely effective manner. By the provision of the improved sliding mounting for the chuck bushing, the bushing is constantly urged outwardly by the action of pressure fluid thereon against the steel collar and thereby tends to reciprocate with the drill steel with the front end of the bushing in substantial sealing contact with the steel collar, thereby substantially to prevent leakage of fluid through the bushing. By slidingly mounting the chuck bushing, it is possible to increase the length of the bushing body so that greater bearing surfaces are afforded, and since the bushing slides outwardly with the drill steel, the possibility of contact of the piston striking bar with the elongated bushing is avoided. The improved bushing structure is relatively simple in design and may be applied to a standard rock drill with a minimum of change. Other manners of use and advantages of the improved drill chuck will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a rock drill, a drill steel chuck comprising a rotatable chuck sleeve, a chuck bushing for receiving and supporting the shank of a reciprocable drill steel and relative to which the steel shank is free to slide during operation of the drill, said bushing mounted in said sleeve for free sliding movement axially relative thereto between two extreme positions, and means for slidingly interlocking said sleeve and bushing for rotation together in all axial positions of said bushing relative to said sleeve including said extreme positions and all intermediate positions while permitting such free sliding movement of said bushing relative to said sleeve.

2. In a fluid operated rock drill, a drill steel chuck comprising a rotatable chuck sleeve, a chuck bushing for receiving the shank of a reciprocable, collared drill steel and relative to which the steel shank is slidable during operation of the drill, said bushing mounted in said sleeve to slide freely axially relative thereto between two extreme positions, said bushing reciprocating with the drill steel and movable forwardly relative to the steel shank to engage sealingly at its front end the steel collar to prevent substantial leakage of fluid through the bushing past the steel shank, means acting on the rear end of said bushing for urging the latter forwardly, and means for slidingly interlocking said sleeve and bushing for rotation together in the axial positions of said bushing including said extreme positions and all intermediate positions while permitting free sliding movement of said bushing.

3. In a fluid operated rock drill, a drill steel chuck comprising a chuck sleeve having a bore to which pressure fluid may be conducted, a chuck bushing for receiving and supporting the shank of a reciprocable, collared drill steel and relative to which the steel shank is free to slide during operation of the drill, said bushing mounted in said sleeve for free sliding movement axially relative thereto, and means effective in all axial positions of said bushing relative to said sleeve for continuously supplying pressure fluid to said bore to subject the rear end of said bushing to the action of pressure fluid to urge said bushing forwardly relative to said sleeve and to the steel shank to bring the front end of said bushing into substantial sealing contact with the steel collar thereby to prevent substantial leakage of fluid through said bushing along the steel shank.

4. In a fluid operated rock drill, a drill steel chuck comprising a rotatable chuck sleeve having a bore to which pressure fluid is supplied and a chuck bushing for slidingly receiving and supporting the shank of a reciprocable drill steel and freely slidably mounted in said sleeve bore between two axial positions, and means providing a splined connection between said sleeve and bushing whereby said bushing may slide freely axially relative to said sleeve while said sleeve and bushing rotate together in all axial positions of said bushing, said bushing having a cylindrical portion rearwardly of said splined connection and tightly and sealingly fitting said sleeve-bore for preventing substantial leakage of fluid from said bore forwardly past said bushing through said splined connection.

5. In a fluid operated rock drill, a drill steel chuck comprising a slidable chuck bushing for receiving and supporting the shank of a reciprocable, collared drill steel and relative to which the steel shank is slidable during operation of the drill, said chuck including means for mounting said bushing for free axial sliding movement, and means operable at will and effective in all axial positions of said bushing relative to said mounting means for continuously supplying pressure fluid to said drill chuck to act on the rear end of said bushing to move the latter forwardly relative to the steel shank, said bushing when in its forward position engaging at its front end the steel collar to prevent substantial leakage of fluid through said bushing past the steel shank.

6. In a rock drill, a drill steel chuck comprising means providing a chamber and a chuck bushing for receiving and supporting the shank of a reciprocable, collared drill steel and mounted in said chamber for free axial sliding movement relative to said means between two longitudinal positions and relative to which the steel shank has free axial sliding movement during operation of the drill, means operable at will and effective in all axial positions of said bushing relative to said chamber providing means for supplying pressure fluid to said chuck chamber rearwardly of said bushing for continuously subjecting the rear end of said bushing to the action of pressure fluid, the pressure fluid acting on said bushing urging the latter forwardly in said chamber relative to the steel shank into a position wherein the front end of said bushing is held in substantial sealing contact with the steel collar to prevent substantial leakage of fluid through said bushing past the steel shank, and said bushing provided with a sealing portion having tight sealing engagement with the walls of said chamber to prevent substantial leakage of fluid from said chamber past the rear end of said bushing between its exterior periphery and the chamber walls.

7. A reciprocable chuck bushing for the reciprocable drill steel of a hammer rock drill comprising a cylindrical body adapted to be guided for axial sliding movement between two extreme positions in a bore of a drill chuck and having an axial opening for slidingly receiving the shank of a drill steel and relative to which the steel shank is reciprocable during operation of the drill, said bushing-body provided with longitudinal splineways on its exterior periphery for sliding interlocking engagement with the splines of a splined driver sleeve between positions of said bushing including said extreme positions and all intermediate positions, and said bushing-body having a cylindrical rearward portion sealingly fitting the chuck bore to prevent substantial leakage of fluid from the chuck bore past said bushing through said splineways.

8. A reciprocable chuck bushing for a reciprocable, collared drill steel of a hammer rock drill comprising a cylindrical body adapted to be guided for axial sliding movement between two extreme positions in a bore of a drill chuck and having an axial opening for slidingly receiving the shank of a drill steel, said body of the bushing provided with longitudinal splineways on its exterior periphery for sliding interlocking engagement with the splines of a splined driver sleeve in all axial positions of said bushing, the rear end of said bushing adapted to be subjected to the action of pressure fluid for urging said bushing forwardly in the chuck-bore for holding the front annular surface thereof in tight sealing contact with the rear annular surface of the steel collar to prevent substantial fluid leakage through the bushing-opening past the steel shank, and the rearward portion of said bushing adapted to have a tight sealing fit with the chuck-bore to prevent substantial leakage of fluid forwardly past said bushing between the bushing periphery and the bore-walls.

9. In a rock drill, a drill steel chuck comprising a freely slidable bushing for receiving and supporting the shank of a reciprocable drill steel and means for mounting said bushing for free sliding movement axially relative to said chuck between two extreme positions, the steel shank received in said bushing and having free sliding movement relative to said bushing and said bushing reciprocating with the steel shank between said extreme positions during operation of the drill, and means effective in all positions of said bushing axially relative to said mounting means between said extreme positions for continuously subjecting said bushing to the action of pressure fluid to urge said bushing forwardly relative to and with the steel shank.

10. In a rock drill, rotatable driver means providing an elongated chamber, a sliding chuck member contained in said chamber for slidingly receiving and supporting the shank of a reciprocable drill steel and which is movable axially in said chamber either with or relative to the steel shank between two predetermined extreme positions through a distance at least as great as the distance between the limits of axial movement of the steel shank during operation of the drill, and means for connecting said chuck member to said driver means for rotation therewith in all axial positions of said chuck member relative to said driver means while permitting free axial sliding movement of said chuck member relative thereto between said predetermined extreme positions.

11. In a fluid operated rock drill, a drill steel chuck comprising a reciprocable chuck bushing for receiving and supporting the shank of a hollow, reciprocable, collared drill steel and slidable freely axially in a bore in the chuck between two longitudinal positions and relative to which the steel shank is slidable during operation of the drill, said bushing being free to reciprocate with the drill steel, and having a rear pressure area subjected to the action of presure fluid for urging said bushing forwardly to hold its front end against the steel collar as said bushing reciprocates with the steel, and means operable at will and effective irrespective of the axial position of said bushing for continuously supplying pressure fluid in relatively large volume to the chuck whereby fluid is conducted through the hollow steel to the drill hole to clear away the cuttings, and the fluid flowing to the chuck acting on the rear pressure area of said bushing to urge the latter forwardly as aforesaid.

12. In a fluid operated rock drill, a drill steel chuck comprising a reciprocable chuck bushing for receiving and supporting the shank of a hollow, reciprocable, collared drill steel and slidable freely axially in a bore in the chuck between two longitudinal positions and relative to which the steel shank is slidable during operation of the drill, said bushing being free to reciprocate with the drill steel, and having a rear pressure area subjected to the action of pressure fluid for urging said bushing forwardly to hold its front end against the steel collar as said bushing reciprocates with the steel, means operable at will and effective irrespective of the axial position of said bushing for continuously supplying pressure fluid in relatively large volume to the chuck whereby fluid is conducted through the hollow steel to the drill hole to clear away the cuttings, and the fluid flowing to the chuck acting on the rear pressure area of said bushing to urge the latter forwardly as aforesaid, and the front end of said bushing having tight sealing engagement with the steel collar to prevent substantial leakage of fluid through said bushing past the steel shank during the hole cleaning operation.

13. In a fluid operated rock drill, a drill steel chuck comprising a reciprocable chuck bushing for receiving and supporting the shank of a hollow, reciprocable, collared drill steel and slidable freely axially in a bore in the chuck between two longitudinal positions and relative to which the steel shank is slidable during operation of the drill, said bushing being free to reciprocate with the drill steel, and having a rear pressure area subjected to the action of pressure fluid for urging said bushing forwardly to hold its front end against the steel collar as said bushing reciprocates with the steel, and means operable at will and effective irrespective of the axial position of said bushing for continuously supplying pressure fluid in relatively large volume to the chuck whereby fluid is conducted through the hollow steel to the drill hole to clear away the cuttings, the fluid flowing to the chuck acting on the rear pressure area of said bushing to urge the latter forwardly as aforesaid, and said bushing having a cylindrical rearward portion tightly fitting the walls of the chuck-bore to prevent substantial leakage of fluid past said bushing through the drill chuck.

JOHN C. CURTIS.

REFERENCES CITED

The following references are of record in the file of this patent:

UNITED STATES PATENTS

| Number | Name | Date |
|---|---|---|
| 1,253,561 | App | Jan. 15, 1918 |
| 1,540,909 | Smith | June 9, 1925 |
| 1,637,192 | Jimerson | July 26, 1927 |
| 1,690,571 | Donaldson | Nov. 6, 1928 |
| 1,691,372 | Bayles | Nov. 13, 1928 |
| 1,708,975 | Skaer | Apr. 16, 1929 |
| 1,832,471 | Nell | Nov. 17, 1931 |
| 1,968,902 | Nell | Aug. 7, 1934 |